United States Patent
Raj et al.

(10) Patent No.: US 10,231,274 B2
(45) Date of Patent: *Mar. 12, 2019

(54) MIDRANGE CONTACTLESS TRANSACTIONS

(71) Applicant: Visa International Service Association, San Francisco, CA (US)

(72) Inventors: Thanigaivel Ashwin Raj, Foster City, CA (US); Sanjeev Sharma, Sunnyvale, CA (US); Kaushik Subramanian, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,169

(22) Filed: Jun. 21, 2017

(65) Prior Publication Data
US 2017/0290079 A1     Oct. 5, 2017

Related U.S. Application Data

(63) Continuation of application No. 14/746,470, filed on Jun. 22, 2015, now Pat. No. 9,717,108.
(Continued)

(51) Int. Cl.
*H04W 4/02* (2018.01)
*G06Q 20/32* (2012.01)
(Continued)

(52) U.S. Cl.
CPC ............. *H04W 76/14* (2018.02); *H04L 67/12* (2013.01); *H04W 12/02* (2013.01); *H04W 12/06* (2013.01);
(Continued)

(58) Field of Classification Search
CPC .. H04L 67/12; H04L 63/1441; H04W 76/021; H04W 76/023; H04W 88/12; H04W 4/005; H04W 4/008; H04W 4/18
See application file for complete search history.

(56) References Cited

U.S. PATENT DOCUMENTS

| 8,972,296 B2 | 3/2015 | Govindarajan et al. |
| 2005/0122929 A1* | 6/2005 | Zuniga ................. H04W 76/11 370/328 |

(Continued)

OTHER PUBLICATIONS

Non-Final Office Action, dated Oct. 12, 2016, in U.S. Appl. No. 14/746,470, 7 pages.

*Primary Examiner* — Mohamed A Kamara
(74) *Attorney, Agent, or Firm* — Kilpatrick Townsend & Stockton LLP

(57) ABSTRACT

Techniques for conducting a transaction in a midrange wireless communication system are described. The techniques may include detecting a beacon transmission from a midrange wireless base station, determining that the beacon transmission includes a transaction service identifier, and invoking a transaction application associated with the transaction service identifier. The techniques may also include receiving transaction information for a transaction associated with a transaction identifier mapped to the device identifier; and sending a transaction cryptogram from the transaction application to the midrange wireless base station to conduct the transaction.

20 Claims, 13 Drawing Sheets

Related U.S. Application Data

(60) Provisional application No. 62/015,079, filed on Jun. 20, 2014.

(51) Int. Cl.
| | | |
|---|---|---|
| *H04W 76/14* | (2018.01) | |
| *H04L 29/08* | (2006.01) | |
| *H04W 76/11* | (2018.01) | |
| *H04W 12/02* | (2009.01) | |
| *H04W 12/06* | (2009.01) | |
| *H04W 88/12* | (2009.01) | |
| *H04W 84/18* | (2009.01) | |
| *H04W 48/16* | (2009.01) | |

(52) U.S. Cl.
CPC ............ *H04W 76/11* (2018.02); *H04W 48/16* (2013.01); *H04W 84/18* (2013.01); *H04W 88/12* (2013.01)

(56) References Cited

U.S. PATENT DOCUMENTS

| | | |
|---|---|---|
| 2013/0085941 A1 | 4/2013 | Rosenblatt et al. |
| 2014/0073252 A1 | 3/2014 | Lee et al. |
| 2014/0108197 A1 | 4/2014 | Smith et al. |
| 2014/0114778 A1 | 4/2014 | Miller et al. |
| 2014/0188733 A1 | 7/2014 | Granbery |
| 2015/0051977 A1 | 2/2015 | Lyman et al. |
| 2015/0120504 A1* | 4/2015 | Todasco ............... G06Q 20/322 705/26.61 |

* cited by examiner

MIDRANGE CONTACTLESS TRANSACTIONS

CROSS-REFERENCES TO RELATED APPLICATIONS

This application is a continuation of U.S. patent application Ser. No. 14/746,470 filed Jun. 22, 2015, which claims the benefit of priority to U.S. Provisional Application No. 62/015,079 filed Jun. 20, 2014, which are herein incorporated by reference in their entireties for all purposes.

BACKGROUND

Midrange wireless communication technologies can pair devices that are much further apart than Near Field Communication (NFC). For example, a Bluetooth or Bluetooth Low Energy (BLE) enabled device may have an extended range of ten to hundreds of feet or greater as compared to a range of less than a few inches for NFC. Hence, at any point in time, a midrange wireless enabled communication device can be within the range of multiple devices that can be paired with the communication device.

When communicating sensitive information such as account credentials to conduct a transaction via NFC, an acceptance device can determine which communication device is performing the transaction, because there is usually only one communication device in close proximity to and within the range of the NFC receiver of the acceptance device. However, when using midrange wireless communication technologies, there can be several communication devices present within the range of a midrange wireless receiver, and thus it may be difficult to discern which communication device within range is performing a particular transaction.

Embodiments of the present invention address these and other problems individually and collectively.

BRIEF SUMMARY

A communication device for use in a midrange wireless communication system may include a midrange wireless transceiver, a controller, and a memory storing a set of instructions. The set of instructions may cause the communication device to detect, using the midrange contactless transceiver, a beacon transmission from a midrange wireless base station, determine that the beacon transmission includes a transaction service identifier recognized by a transaction application accessible to the communication device, and in response to determining that the beacon transmission includes a transaction service identifier recognized by the transaction application, invoke a transaction application associated with the transaction service identifier; and establish a secured communication channel with the midrange wireless base station. The set of instructions may further cause the communication device to receive, on the secured communication channel, transaction information for a transaction associated with a transaction identifier mapped to a device identifier associated with the communication device, and transmit, on the secured communication channel, a transaction cryptogram from the transaction application to the midrange wireless base station to conduct the transaction.

Techniques for conducting a transaction in a midrange wireless communication system may involve detecting, by a midrange wireless transceiver of a communication device, a beacon transmission from a midrange wireless base station, determining that the beacon transmission includes a transaction service identifier, in response to determining that the beacon transmission includes a transaction service identifier, invoking a transaction application associated with the transaction service identifier; and establishing a secured communication channel with the midrange wireless base station. The techniques may also include receiving, from the midrange wireless base station on the secured communication channel, transaction information for a transaction associated with a transaction identifier mapped to a device identifier associated with the communication device, and sending a transaction cryptogram from the transaction application to the midrange wireless base station to conduct the transaction.

A mobile device for use in a midrange wireless communication system may include a midrange wireless transceiver, a processor, and a memory storing a set of instructions. The set of instructions may cause the mobile device to establish a communication channel with a communication device via the midrange wireless transceiver, receive a request to invoke a transaction application associated with a transaction service identifier of a beacon transmission from a midrange wireless base station detected by the communication device, execute the transaction application associated with the transaction service identifier, receive transaction information of a transaction associated with a transaction identifier mapped to a device identifier associated with the communication device, and transmit a transaction cryptogram to the communication device for forwarding to the midrange wireless base station to conduct the transaction.

DETAILED DESCRIPTION

Figure 1:
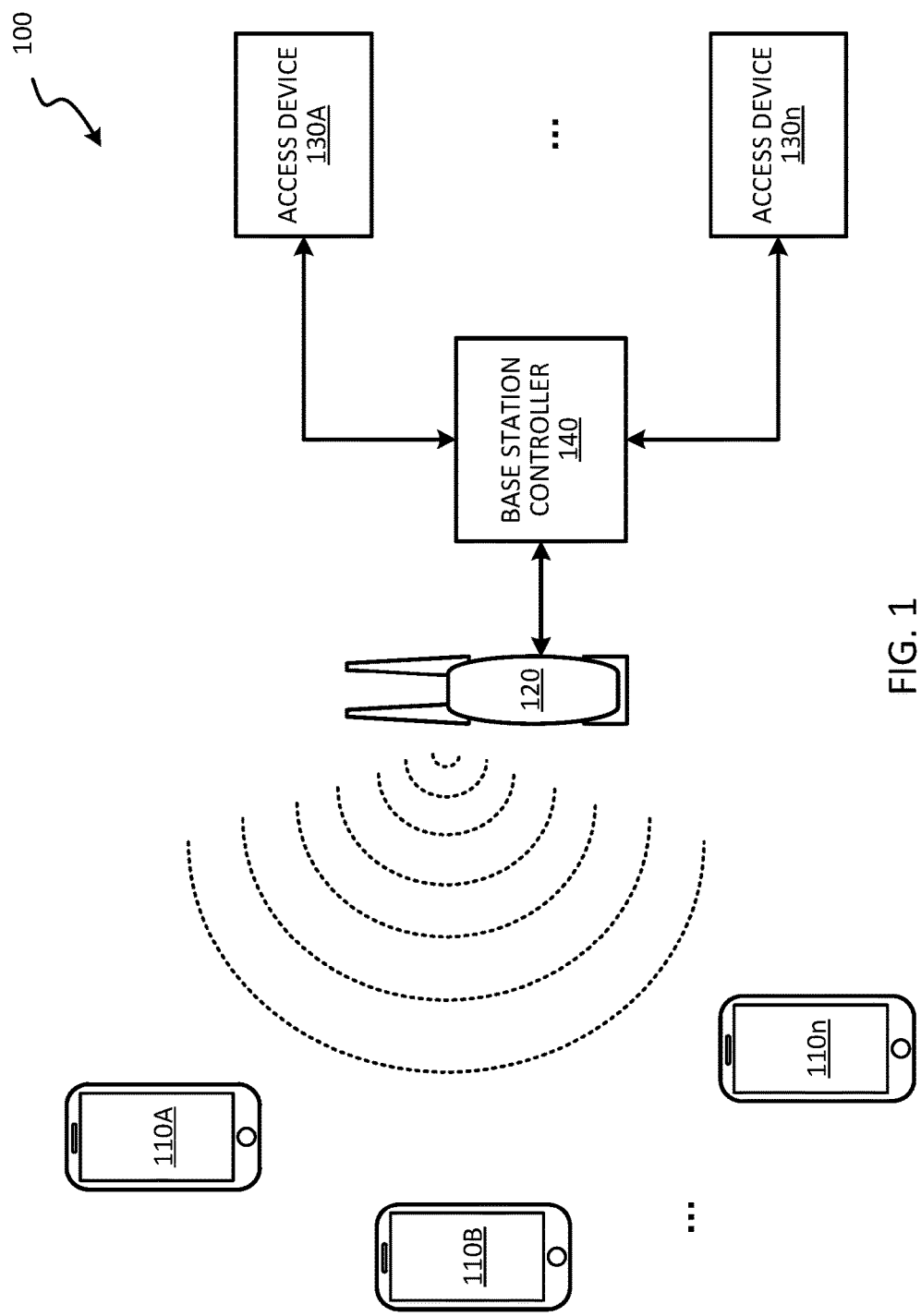
FIG. 1 illustrates a block diagram of a midrange wireless communication system, according to some embodiments.

Embodiments of the present invention provides methods, devices, and systems for performing midrange wireless communications, and more specifically, for performing contactless transactions using midrange wireless communication technologies. As compared to proximity implementations such as Near Field Communication (NFC), additional care is taken to ensure that a communication device is correctly mapped to a particular transaction such that communications (e.g., transmission of account credentials) from a communication device can be properly applied to the intended transaction. In some embodiments, a transaction service identifier transmitted over a beacon from a midrange wireless base station is used to invoke a transaction application, and a device identifier associated with communication device conducting the transaction is provided to the midrange wireless base station in exchange for a transaction identifier that is mapped to the communication device. The transaction identifier can then be used by an acceptance device to properly identify the communication device conducting the transaction.

Prior to discussing embodiments of the invention, description of some terms may be helpful in understanding embodiments of the invention.

A "wireless communication technology" may refer to a wireless communication technology that can be used to pair two communication devices together such that the two communication devices can exchange information wirelessly. In some embodiments, "midrange" may refer to a medium range of distance that a signal from a wireless transceiver may reach. For example, the range of a midrange wireless transceiver may be less than a few feet, less than a few tens of feet, less than a few hundred feet, or less than a few thousand feet, etc. Examples of midrange wireless communication technologies may include Bluetooth, Bluetooth Low Energy (BLE), ZigBee, or other suitable protocols for communicating over midrange distances. In some embodiments, a midrange wireless transceiver employing the midrange wireless communication technology may be within range of multiple communication devices at any one point in time. In contrast to proximity wireless communication technologies such as Near Field Communication (NFC) which may typically have no more than one communication device within the short range of the proximity wireless transceiver at any one point in time, addition care may be needed to ensure that the midrange wireless transceiver is communicating with the proper communication device, for example, when transmitting sensitive information such as account credentials to conduct a transaction via the midrange wireless communication technology. A transaction conducted by transmitting information using a midrange wireless communication technology may be referred to as a "midrange contactless transaction."

A "communication device" may be a device that includes one or more electronic components (e.g., an integrated chip) that can communicate with another device. A portable communication device may be one form of a communication device that can be transported and operated by a user. A portable communication device may provide remote communication capabilities to a network, and can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., smart watch, health monitoring device, etc.), electronic reader device, etc., or in the form of a card (e.g., smart card) or a fob, etc. Examples of portable communication devices may also include portable computing devices (e.g., laptop, netbook, ultrabook, etc.). A portable communication device may also be in the form of a vehicle that can be operated by a user to transport the user. The vehicle may be equipped with communication and/or network connectivity capabilities. For example, a vehicle may include an automobile such as car or motorcycle that is equipped with a wireless transceiver. In some embodiments, a communication device can be communicatively coupled to another communication device (e.g., a mobile device) and act as an accessory to that communication device to extend the functionalities of that communication device. Examples of a communication device that may act as an accessory communicatively coupled to a mobile device such as a smart phone may include a wearable device, a vehicle, etc. In some embodiments, a mobile device such as a smart phone can also act as an accessory to another mobile device such as a portable computer.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, a server computer can be located remotely from a device communicating with the server computer, and the remote server computer may be referred to as the "cloud."

A "wireless base station" may refer to a device that provides the communication connectivity between communication devices and a network (e.g., a local network such as a computer network at a merchant location). A wireless base station may include one or more wireless transceivers and one or more antennae to interact with wireless transceivers of communication devices to provide the communication connectivity between the communication devices and a network. In some embodiments, a wireless bases station may convert communications or messages from one communication protocol to another communication protocol.

A "base station controller" may refer to a device that controls and configures functionalities for a wireless base station. A base station controller may include one or more processors or controllers and a memory, and may be coupled to a wireless base station through a dedicated hardware interface such as a wired connection. In some embodiments, the base station controller can be integrated with wireless base station into a single device.

A "token" may be a substitute for sensitive information. A token may refer to information that can be transmitted or use in place of the sensitive information. For example, a token can be a substitute for sensitive information such as a real account identifier, and the token may be used in place of the real account identifier to conduct access the account. In the payment context, a payment token may be an identifier for a payment account and act as a substitute for the real account identifier (e.g., a primary account number (PAN)). A token may include a series of alphanumeric characters that may be used as a substitute for an original account identifier. For example, a token "4900 0000 0000 0001" may be used in place of a primary account number (PAN) "4147 0900 0000 1234." In some embodiments, a token may be format preserving and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token can be generated in a manner such that the recovery of the original sensitive information (e.g., PAN) may not be algorithmically or computationally derived. For example, a token may include random numbers so that the PAN associated with the token is not computationally derivable from the token. A lookup table may be used to associate a PAN and a corresponding token. In some embodiments, a token can be a non-payment token that is used as a substitute for other types of sensitive information.

An "issuer" may typically refer to a business entity (e.g., a bank) that maintains an account (e.g., a financial account) for a user. The account can be enrolled in an application installed on a communication device of the user to allow the user to conduct transactions on the account via the communication device. A "merchant" may typically be an entity that engages in transactions and can sell goods or services, or provide access to goods or services. An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network (e.g., payment processing network), and for interacting with a consumer communication device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a consumer communication device. In some embodiments, where an access device may comprise a Point-of-Sale (POS) terminal, any suitable POS terminal may be used and may include a reader, a processor, and a computer-readable medium. For example, exemplary readers can include radio frequency (RF) antennas, optical scanners, bar code readers, or magnetic stripe readers to interact with a consumer communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

"Provisioning" may include a process of providing data for use. For example, provisioning may include providing, delivering, or enabling a token and/or a limited-use key (LUK) on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

A "user" may include an individual or a consumer that operates a communication device to conduct a transaction on an account or otherwise manage an account. The consumer may also be referred to as a cardholder, accountholder, or user. The term "consumer" may be used interchangeably with the term "user."

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account. Examples of a dynamic account parameter may include a limited-use key that is used as an encryption key to generate transaction cryptograms. Examples of a semi-static account parameter may include a token that is a substitute for a real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. In some embodiments, a key may be a limited-use key (LUK) that is subject to one or more limitesd-use thresholds to limit the usage of the LUK, which once exceeded, the LUK is no longer valid, and further usage of the LUK may require replenishment or renewal of the LUK.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

The term "authentication" and its derivatives may refer to a process by which the credential of an endpoint (including but not limited to applications, people, devices, processes, and systems) can be verified to ensure that the endpoint is who they are declared to be.

A "payment processing network" may include a network of one or more devices that can process and route transaction request messages. An exemplary transaction processing system may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of various embodiments of the present invention will now be described.

FIG. 1 illustrates a midrange wireless communication system 100, according to some embodiments. Midrange wireless communication system 100 can be located, for example, at a merchant location. Midrange wireless communication system 100 may include a midrange wireless base station 120 and a base station controller 140 coupled to midrange wireless base station 120. Midrange wireless communication system 100 may also include one or more communication devices 110A-110n within the wireless range (e.g., within a few hundred feet) of midrange wireless base station 120, and one or more access devices 130A-130n coupled to base station controller 140.

Midrange wireless base station 120 can exchange wireless communications with one or more communication devices 110A-110n within range of midrange wireless base station 120 using a midrange wireless communication technology such as Bluetooth, Bluetooth Low Energy (BLE), or other suitable midrange wireless communication technologies. In some embodiments, midrange wireless base station 120 can be configured by base station controller 140 to transmit a beacon detectable by a communication device (e.g., any of communication devices 110A-110n) to advertise the presence of midrange wireless base station 120. For example, the beacon can be transmitted periodically, and may include a unique identifier such as a universally unique identifier (UUID) to identify midrange wireless base station 120 or a service (e.g., a transaction service) provided by midrange wireless base station 120 to a communication device. Upon a communication device detecting the beacon, a communication channel can be established between midrange wireless base station 120 and the communication device to exchange information such as transaction information or account credentials.

Base station controller 140 controls the functionality of midrange wireless base station 120, and facilitates communication exchanges between one or more access devices 130A-130n and one or more communication devices 110A-110n within range of midrange wireless base station 120. In some embodiments, base station controller 140 can be implemented as part of a merchant computer, or base station controller 140 can be integrated with midrange wireless base station 120. In some embodiments, when a communication channel is established between midrange wireless base station 120 and a communication device, base station controller 140 may receive a device identifier from the communication device, generate a transaction identifier, and map the transaction identifier to the communication device. Base station controller 140 may maintain a local database that stores mappings of device identifiers to transaction identifiers.

An access device (e.g., any of access devices 130A-130n) may interact with a communication device (e.g., any of communication devices 110A-110n) or a user of the communication device to conduct a transaction. In some embodiments, a transaction identifier for a transaction can be provided to the access device (e.g., on a user interface such as a PIN pad, or on a communication channel established with the access device), and access device may provide transaction information such as a transaction amount for a transaction associated with the transaction identifier to base station controller 140. Base station controller 140 may then look up the communication device corresponding to the device identifier mapped to the transaction identifier, and request account credentials from the proper communication device to conduct the transaction.

A communication device (e.g., any of communication device 110A-110n) may include a midrange wireless transceiver suitable for communication with midrange wireless base station 120. The communication device can be operated by a user, and when the user with the communication device enters the vicinity of a merchant location equipped with midrange wireless base station 120, the communication device may detect the presence of a beacon transmission from midrange wireless base station 120. The communication device may determine if a unique identifier (e.g., a UUID) of the beacon transmission matches a transaction service identifier associated with a transaction application, and if so, the communication device may invoke the transaction application associated with the transaction service identifier to conduct a transaction. In some embodiments, the transaction application can be resident on the communication device itself, or can be installed on a different device. For example, the communication device can be an accessory of a mobile device, and the transaction application can be installed on the mobile device and invoked from the accessory in response to the accessory detecting the presence of a beacon transmitting a matching transaction service identifier.

Figure 2:
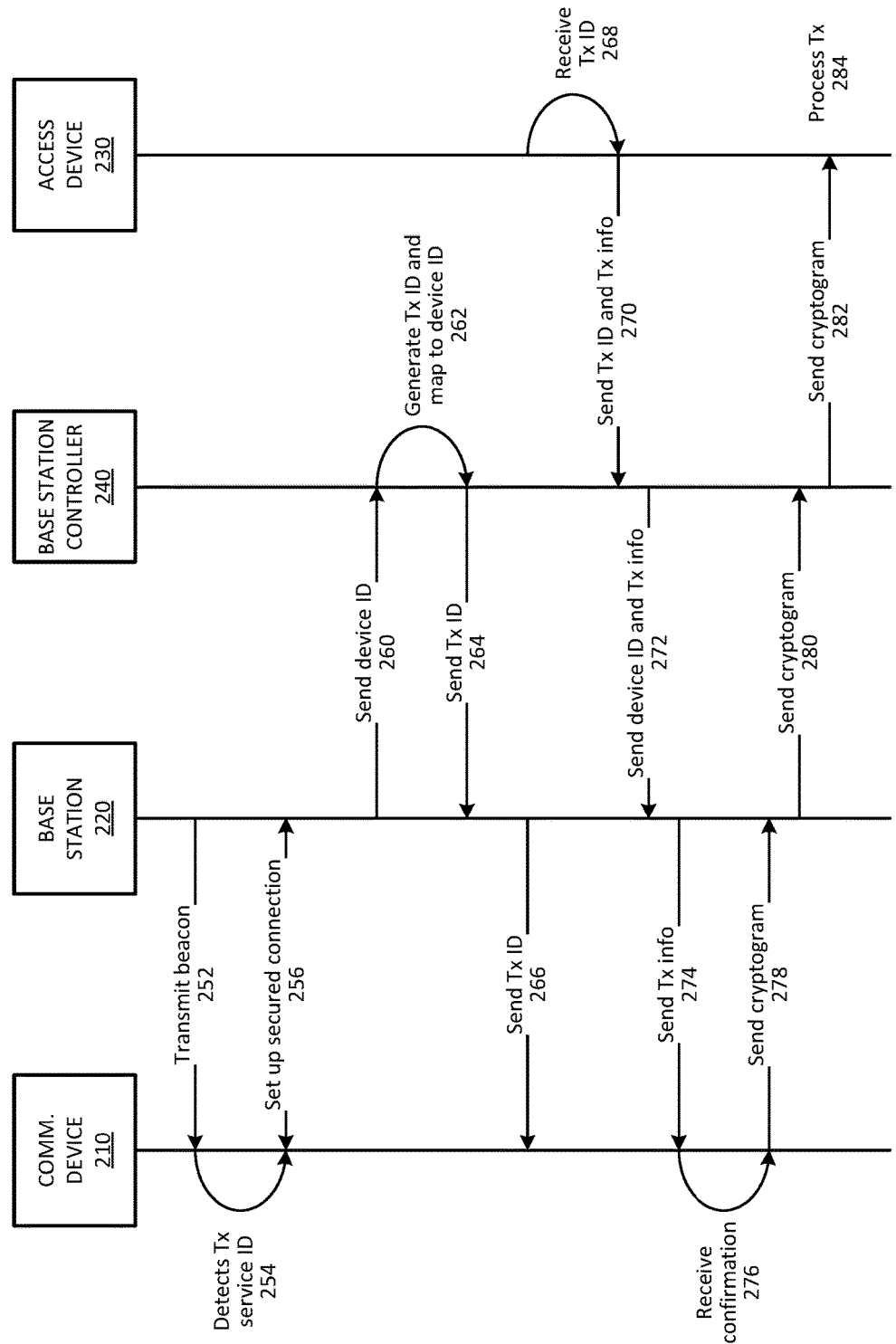
FIG. 2 illustrates a transaction flow diagram, according to some embodiments.

FIG. 2 illustrates a transaction flow diagram, according to some embodiments. The transaction flow may begin by midrange wireless base station 220 at a merchant location transmitting a beacon 252 with a transaction service identifier. The beacon can be transmitted periodically by midrange wireless base station 220 using a midrange wireless communication technology such as Bluetooth, BLE, or other suitable midrange wireless communication technologies. In some embodiments, the transaction service identifier can be in the form of a UUID, and the transaction service identifier can be associated with a payment processing provider. In some embodiments, the transaction service identifier can be universally recognized by different transaction applications (e.g., transaction applications from different merchants, issuers, and/or mobile wallet providers, etc.). The transaction service identifier can be used by midrange wireless base station 220 to advertise to communication device 210 that the midrange wireless communication system provides transaction services such as facilitating payment transactions.

When a communication device 210 comes within range of the beacon, communication device 210 may detect the beacon transmission from the midrange wireless base station 220 via the midrange contactless transceiver of the communication device 210 at 254, and determine that the beacon transmission includes a transaction service identifier that corresponds to a transaction application accessible by the communication device 210. For example, a list of recognizable service identifiers can be stored in a registry, and the detected transaction service identifier can be compared with the entries in the registry. In response to determining that the beacon transmission includes a valid transaction service identifier, the communication device may invoke the transaction application associated with the transaction service identifier. In some embodiments, the transaction application can be resident on the communication device 210 or be installed on another device communicatively coupled to communication device 210. In some embodiments, invoking the transaction application may include attempting to communicate with the transaction application, and/or if the transaction application is not already open, causing the transaction application to be opened (e.g., by launching the transaction application, or by presenting a message to request a user to launch the transaction application).

The transaction flow then continues by setting up a secured connection at 256 between communication device 210 and midrange wireless base station 220. For example, the secured connection can be established by using a shared key to encrypt and decrypt the communications between communication device 210 and midrange wireless base station 220. Once the secured connection at 256 is established, communication device 210 and midrange wireless base station can communicate with each other using a suitable midrange wireless communication technology.

Midrange wireless base station 220 may then provide a device ID associated with communication device 210 to base station controller 240 at 260. In some embodiments, the device ID can be a device ID that is generated or received from communication device 210 as part of the process to setup the secured connection at 256. The device ID can be a device ID that identifies communication device 210, or a device ID that identifies another device communicatively couple to communication device 210 on which the transaction application is installed (e.g., an accessory of communication device 210). The device ID can be in the form of an international mobile station equipment identity (IMEI), a mobile equipment identifier (MEID), an electronic serial number (ESN), a device address such as an IP address or an address assigned to communication device 210 by midrange wireless base station 220, or other identification information that midrange wireless base station 220 can use to uniquely identify communication device 210 from other devices within range.

Upon receiving the device ID, base station controller may generate a transaction identifier for communication device 210, and map the transaction identifier to the device ID at 262. In some embodiments, the transaction identifier can be in the form of a PIN. The transaction identifier can be generated as a pseudo random number, or can be generated based on the received device ID, for example, by applying a hash algorithm to the device ID. Base station controller 240 may maintain a database of transaction identifier to device ID mappings. In some embodiments, the transaction identifier to device ID mappings may expire after a predetermined expiration time (e.g., two hours, three hours, etc.), and base station controller 240 may delete the mapping after the predetermined expiration time has elapsed such that the transaction identifier would no longer be valid after the expiration time. In some embodiments, base station controller 240 may flush the mapping database at the end of each day.

After generating the transaction identifier and mapping it to the device ID, base station controller 262 may send the transaction identifier to midrange wireless base station 220 at 264. Upon receive the transaction identifier, midrange wireless base station 220 may forward the transaction identifier to communication device 210 at 266. In some embodiments, communication device 210 may provide the transaction identifier to the transaction application. In some embodiments, communication device 210 may display or cause another device communication coupled to communication device 210 to display the transaction identifier to provide the transaction identifier to the user of communication device 210.

At a later time, when the user approaches access device 230 to conduct a transaction, access device 230 may receive the transaction identifier assigned to communication device 210 at 268. For example, the user of communication device 210 or someone on behalf of the user may enter the transaction identifier on a keypad of access device 230. As another example, the transaction application may display the transaction identifier in the form of a bar code or QR code that can be optically scanned by access device 230. As a further example, the use may tap the communication device 210 against a contactless interface of access device 230 to provide the transaction identifier to access device 230 via NFC or other short range proximity communication protocols.

Upon receiving the transaction identifier, access device 230 may send the transaction identifier along with transaction information associated with the transaction at 270 to base station controller 240. The transaction information may include, for example, a transaction amount. The transaction information may also include other information such as a terminal unpredictable number from access device 230. Base station controller 240 then looks up the device ID that is mapped to the transaction identifier, associates the transaction information with communication device 210 based on the device ID, and provides the device ID and the transaction information to midrange wireless base station 220 at 272.

Based on the device ID, midrange wireless base station 220 then sends the transaction information associated with the transaction identifier to the proper communication device 210 over the secured connection at 274. In some embodiments, upon receiving the transaction information for the transaction associated with the transaction identifier mapped to the device ID, communication device 210 may display or cause another device communicatively coupled to communication device 210 to display at least some of the transaction information (e.g., the transaction amount) via the transaction application to request confirmation from the user to proceed with the transaction. In some embodiments, the user may be allowed to modify the transaction information, such as to enter a different transaction amount or add a tip.

The communication device 210 may then receive confirmation from the user to proceed with the transaction at 276. In some embodiments, the transaction application invoked by communication device 210 may generate a transaction cryptogram based on the received transaction information. For example, the transaction application may generate the transaction cryptogram by performing an encryption operation on the received transaction information using a limited-use key that is only valid for a limited number of transactions. In some embodiments, the transaction application may communicate with a remote server (e.g., the cloud), and request the transaction cryptogram from the remote server. Communication device 210 may then send account credentials (e.g., a primary account number (PAN), a token that is a substitute for a PAN, an alternate PAN, etc., and/or other account parameters) including the transaction cryptogram from the transaction application to midrange wireless base station 220 over the secured connection at 278.

Upon receiving the account credentials including the transaction cryptogram, midrange wireless base station 220 then forwards the account credentials including the transaction cryptogram to base station controller 240 at 280. Midrange wireless base station 220 may also send the device ID and/or the transaction identifier together with the account credentials to base station controller 240. At 282, base station controller 240 forwards the account credentials including the transaction cryptogram to access device 230. Base station controller 240 may also send the device ID and/or the transaction identifier together with the account credentials to access device 230. Access device 230 then processes the transaction using the received account credentials including the transaction cryptogram.

Figure 3:
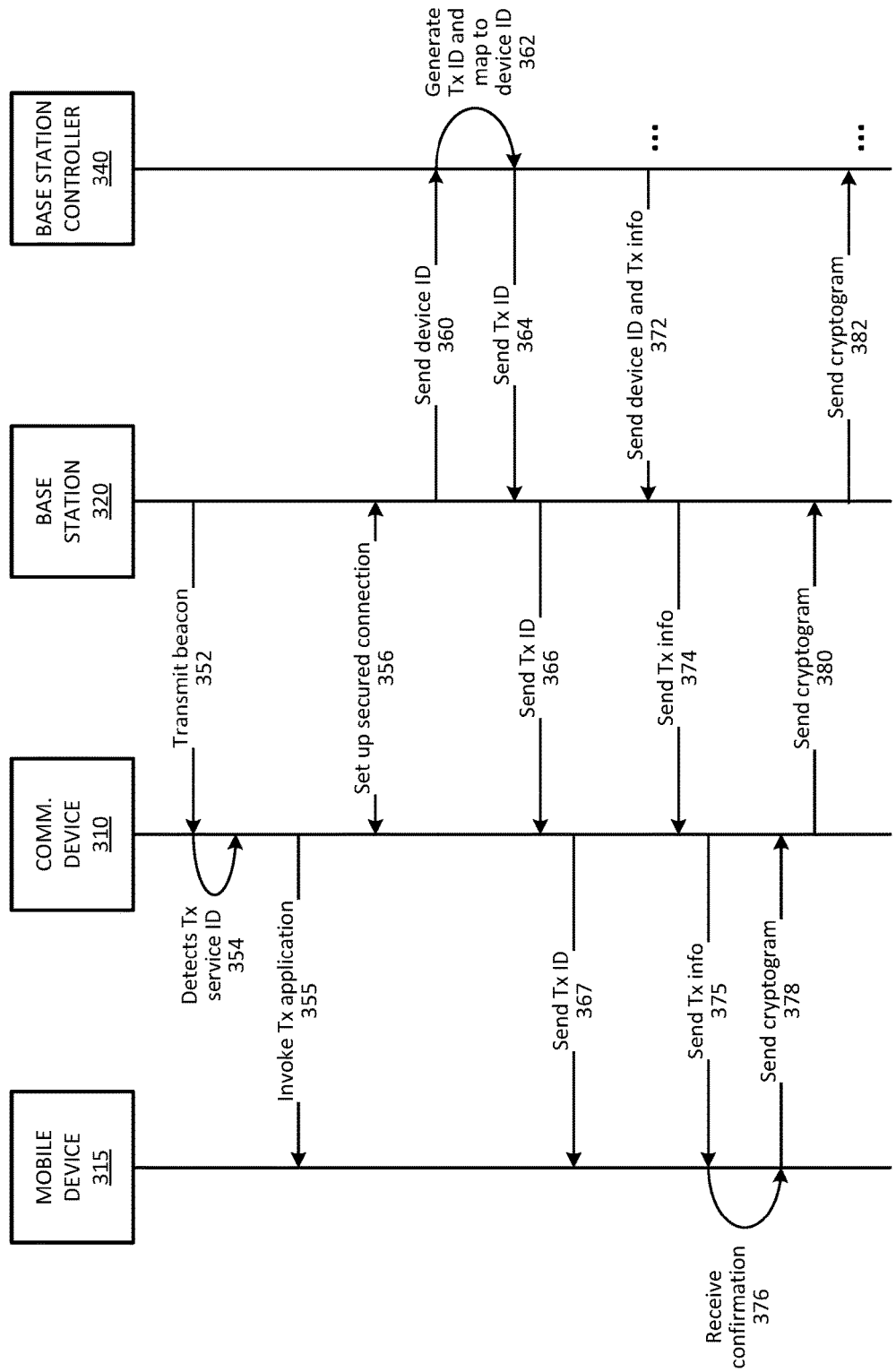
FIG. 3 illustrates a transaction flow diagram involving a mobile device communicatively coupled to a communication device, according to some embodiments.

FIG. 3 illustrates another transaction flow diagram, according to some embodiments. In the transaction flow shown in FIG. 3, the transaction application being invoked to conduct the transaction can be installed and executed on a mobile device 315 that is separate from the communication device 310 that midrange wireless base station 320 directly interacts with. In some embodiments, communication device 310 can be an accessory communicatively coupled to mobile device 315, or vice versa. For example, communication device 310 can be a vehicle (e.g., an automobile) equipped with a midrange wireless transceiver that interacts with midrange wireless base station 320, and mobile device 315 can be a smartphone that is communicatively coupled to the vehicle's infosystem. The communication channel between mobile device 315 and communication device 310 can use the same midrange wireless communication technology as midrange wireless base station 320 (e.g., using Bluetooth or BLE or other suitable communication technologies). In some embodiments, if the midrange wireless transceiver of communication device 310 is capable of connecting with two devices at the same time, the same midrange wireless transceiver of communication device 310 can be used for the connection between mobile device 315 and communication device 310, and for the connection between communication device 310 and midrange wireless base station 320.

In some embodiments, communication device 310 may have multiple wireless transceivers, and one wireless transceiver can be used for the connection between mobile device 315 and communication device 310, and another wireless transceiver can be used for the connection between communication device 310 and midrange wireless base station 320. In some embodiments, the communication channel between mobile device 315 and communication device 310 can use a different communication technology than that of midrange wireless base station 320. In some embodiments, the midrange wireless transceiver of communication device 310 can be used to extend the range of the midrange wireless transceiver of mobile device 315. For example, mobile device 315 can be a smartphone carried by a user inside a vehicle acting as communication device 310, and the midrange wireless transceiver of the vehicle can be located at or near the exterior body of the vehicle to extend the communication range of the midrange wireless transceiver of mobile device 315 located inside the vehicle.

It should also be noted that in the transaction flow of FIG. 3, the interactions between base station controller 340 and an access device are similar to those described above with reference to FIG. 2, and thus the access device has been omitted from FIG. 3. However, it should be understood that the transaction flow shown in FIG. 3 may involve an access device using similar techniques as those described above. Furthermore, for ease of explanation and conciseness, some details of the interactions shown in FIG. 3 which are similar to those with respect to FIG. 2 have been omitted from the description below. However, it should be understood that the techniques described above with respect to FIG. 2 may also apply to the interactions shown in FIG. 3 described below.

The transaction flow in FIG. 3 may begin by midrange wireless base station 320 transmitting a beacon 352 with a transaction service identifier (e.g., in the form of a UUID). When a communication device 310 comes within range of the beacon at 354, communication device 310 may detect the beacon transmission from the midrange wireless base station 320 via the midrange contactless transceiver of the communication device 310, and determine that the beacon transmission includes a transaction service identifier that corresponds to a transaction application accessible by the communication device 310. In response to determining that the beacon transmission includes a recognizable transaction service identifier, communication device 310 may invoke a transaction application associated with the transaction service identifier at 355. In the embodiment shown in FIG. 3, the transaction application can be resident on a mobile device 315 that is communicatively coupled to communication device 310, and communication device 310 may invoke the transaction application, for example, by sending the transaction service identifier to mobile device 315 over a previously established communication channel between communication device 310 and mobile device 315 to request mobile device 315 to execute the transaction application on mobile device 315, or otherwise attempt to communicate with the transaction application executing on mobile device 315.

The transaction flow then continues at 356 by communication device 310 setting up a secured connection between communication device 310 and midrange wireless base station 320. Midrange wireless base station 320 may then provide a device ID associated with commination device 310 to base station controller 340 at 360. In some embodiments, the device ID can be a device ID that identifies communication device 310, or a device ID that identifies mobile device 315. The device ID can be generated by midrange wireless base station 320, or received from communication device 310 as part of the process of setting up the secured connection. Upon receiving the device ID, base station controller 340 may generate a transaction identifier, and map the transaction identifier to the device ID at 362.

After generating the transaction identifier and mapping it to the received device ID, base station controller 340 may send the transaction identifier to midrange wireless base station 320 at 364. Upon receiving the transaction identifier, midrange wireless base station 320 may forward the transaction identifier to communication device 310 at 366. In some embodiments, communication device 310 may send the transaction identifier at 367 to the transaction application running on mobile device 315. In some embodiments, communication device 310 or mobile device 315 may display the transaction identifier to provide the transaction identifier to the user of communication device 310.

At a later time, when the user approaches an access device (not shown) to conduct a transaction, the access device may receive the transaction identifier assigned to communication device 310. For example, the user of communication device 310 or someone on behalf of the user may enter the transaction identifier on a keypad of access device or otherwise provide the transaction identifier to the access device. Upon receiving the transaction identifier, the transaction information of the transaction associated with the transaction identifier to base station controller 340. Base station controller 340 then looks up the device ID that is mapped to the transaction identifier, associates the transaction information with communication device 310 based on the device ID, and provides the device ID and the transaction information to midrange wireless base station 320 at 372.

Based on the device ID, midrange wireless base station 320 then sends the transaction information associated with the transaction identifier to communication device 310 over the secured connection at 374. In some embodiments, upon receiving the transaction information for the transaction associated with the transaction identifier mapped to the device ID, communication device 310 may forward the transaction information to the transaction application running on mobile device 315 at 375. The transaction information such as the transaction amount can be displayed on commination device 310 or on mobile device 315 to request confirmation from the user to proceed with the transaction. In some embodiments, the transaction application may not provide account credentials until after a user provides confirmation to proceed with the transaction.

In some embodiments, the user may modify the transaction information before proceeding with the transaction. Mobile device 315 or communication device 310 may receive input to modify the received transaction information (e.g., to adjust the transaction amount or add a tip, etc.). At 376, mobile device 315 may receive a confirmation input (with or without modification to the transaction information) to proceed with the transaction. In some embodiments, the confirmation input can alternatively be provided on communication device 310. The transaction application running on mobile device 315 may then generate a transaction cryptogram based on the received transaction information, and send account credentials including the transaction cryptogram to communication device 310 at 378. Communication device 310 then forwards the account credentials including the transaction cryptogram to midrange wireless base station 320. At 382, midrange wireless base station 320 forwards the account credentials including the transaction cryptogram to base station controller 340, which then forwards the information to an access device for processing.

FIGS. 4-12 illustrates various flow diagrams of conducting transactions in various environments using variations of the midrange wireless communication techniques described above, according to some embodiments. In the description below, the midrange wireless base station and the base station controller at a merchant location may collectively be referred to as a midrange communication system.

Figure 4:
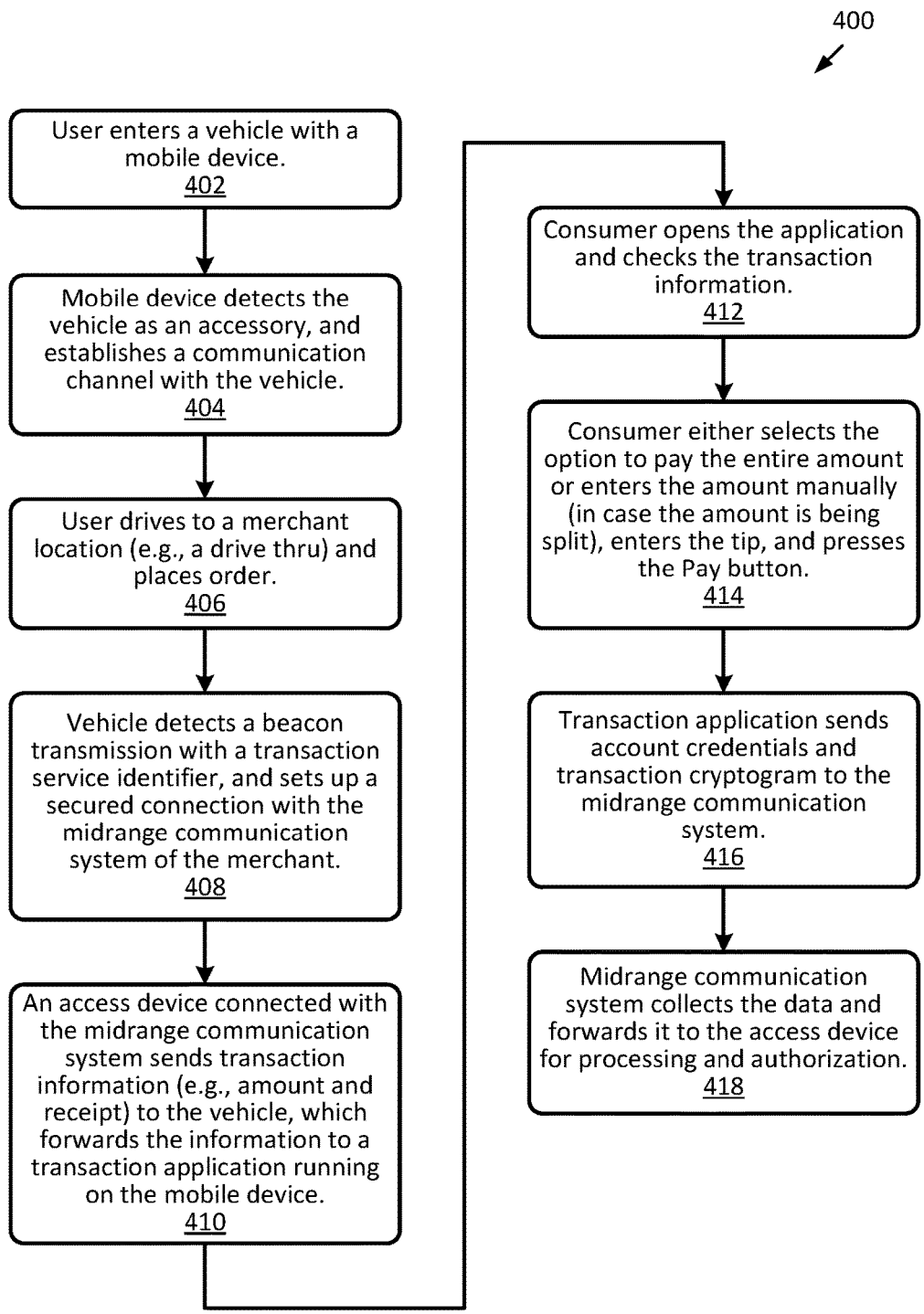
FIG. 4 illustrates a flow diagram of conducting a transaction using a mobile device communicatively coupled to a communication device, according to some embodiments.

FIG. 4 illustrates a flow diagram 400 of conducting a transaction using a mobile device communicatively coupled to a communication device (e.g., a vehicle), according to some embodiments. The transaction may take place, for example, at a drive-thru merchant location such as a drive-thru restaurant, etc. At block 402, a user with a mobile device (e.g., a mobile phone) enters a vehicle equipped with midrange wireless communication capabilities. At block 404, the mobile device detects the vehicle as an accessory, and establishes a communication channel with the vehicle (e.g., over Bluetooth, BLE, or other suitable wireless communication technologies, etc.). This communication channel can be used by the mobile device to exchange data with the vehicle, for example, to place voice calls, stream audio, etc. using vehicle's infosystem. The vehicle (e.g., vehicle's infosystem) can be programmed to recognize a set of service identifiers including a transaction service identifier associated with a transaction application installed on the mobile device.

At block 406, the user drives to a merchant location such as a drive-thru, and places an order (e.g., for a meal) from the merchant. At block 408, the vehicle detects a beacon transmission with a transaction service identifier recognized by the vehicle, and sets up a secured connection with the midrange communication system of the merchant. At block 410, an access device connected with the midrange communication system of the merchant sends transaction information (e.g., transaction amount and receipt) to the vehicle, which then forwards the information to the transaction application running on the mobile device for approval by the user. At block 412, the user opens the transaction application on the mobile device and verifies the transaction information.

At block 414, the user either selects the option to pay the entire transaction amount or enters the amount manually (e.g., in case the amount is being split with others), enters the tip amount (if any), and clicks a 'Pay' button on the transaction application to approve the amount. At block 416, the transaction application sends the account credentials and transaction cryptogram to the midrange communication system via the vehicle. At block 418, the midrange communication system collects the account credentials and transaction cryptogram, and forwards the data to the access device for processing and authorization. For example, access device may generate a transaction authorization message using the account credentials and transaction cryptogram, and send the transaction authorization message to a payment processing network for processing.

Figure 5:
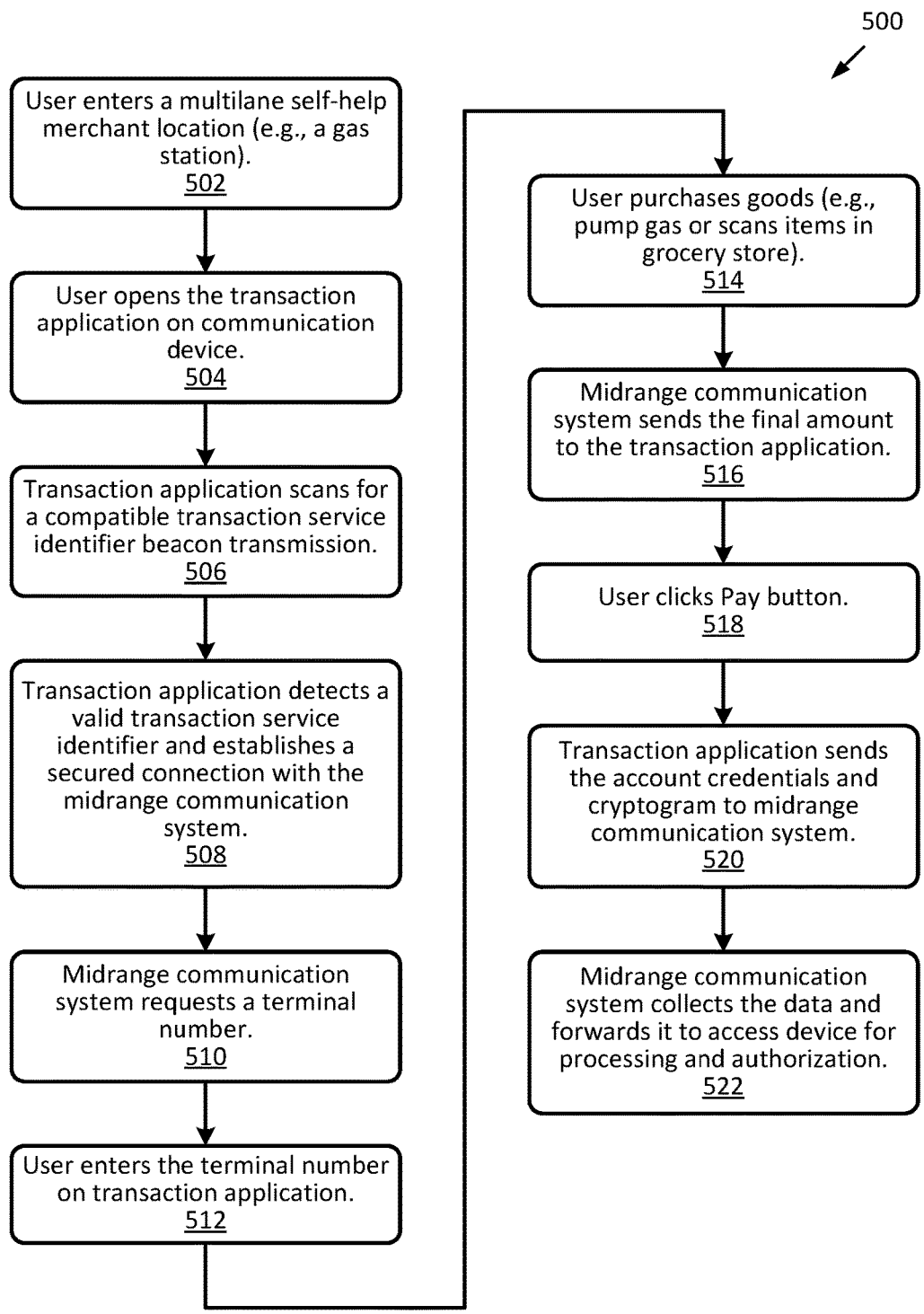
FIG. 5 illustrates a flow diagram of conducting a transaction at a multilane self-help location, according to some embodiments.

FIG. 5 illustrates a flow diagram 500 of conducting a transaction at a multilane self-help merchant location, according to some embodiments. The multilane self-help location can be, for example, a gas station, a grocery store, etc. At block 502, a user enters a multilane self-help merchant location. At block 504, the user opens the transaction application on the user's communication device. At block 506, the transaction application scans for a compatible transaction service identifier beacon transmission. At block 508, the communication device detects a beacon transmission with a transaction service identifier recognized by the transaction application, and sets up a secured connection with the midrange communication system of the merchant.

At block 510, the midrange communication system of the merchant sends a request for a terminal number to the transaction application. At block 512, the user enters, on the transaction application, the terminal number or checkout lane number at which the user is conducting the transaction. At block 514, the user purchases goods or services such as pumping gas or scanning items at a grocery store. At block 516, the midrange communication system of the merchant sends the final transaction amount to the transaction application for approval by the user. If the user approves the transaction amount, the consumer may click a 'Pay' button on the transaction application at block 518. At block 520, the transaction application sends the user's account credentials and transaction cryptogram to the midrange communication system. At block 522, the midrange communication system collects the account credentials and transaction cryptogram, and forwards it to an access device associated with the terminal for processing and authorization.

Figure 6:
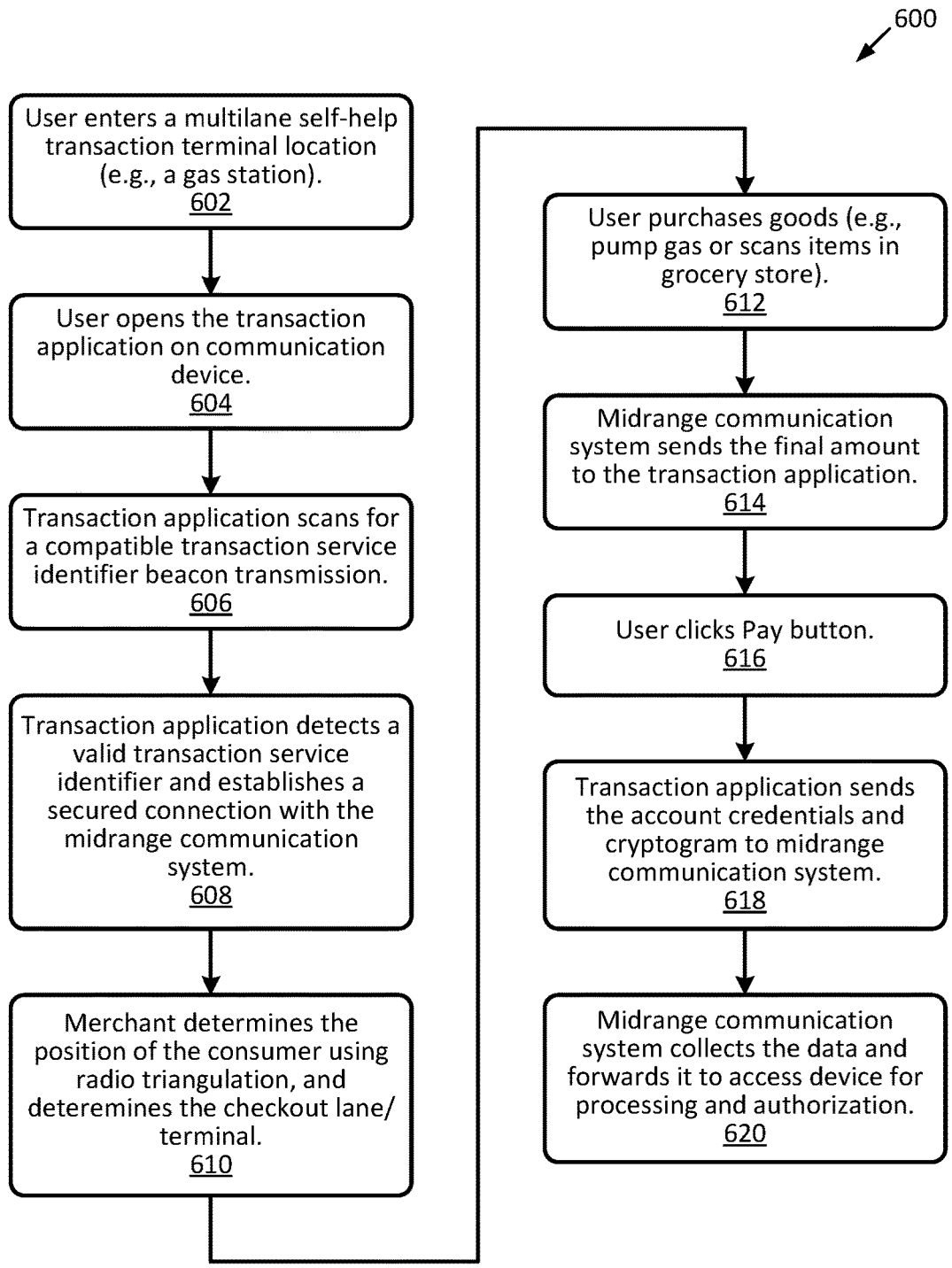
FIG. 6 illustrates another flow diagram of conducting a transaction at a multilane self-help location, according to some embodiments.

FIG. 6 illustrates another flow diagram 600 of conducting a transaction at a multilane self-help merchant location, according to some embodiments. The multilane self-help location can be, for example, a gas station, a grocery store, etc. At block 502, a user enters a multilane self-help merchant location. At block 504, the user opens the transaction application on the user's communication device. At block 506, the transaction application scans for a compatible transaction service identifier beacon transmission. At block 508, the communication device detects a beacon transmission with a transaction service identifier recognized by the transaction application, and sets up a secured connection with the midrange communication system of the merchant.

At block 610, the merchant determines the position of the user using radio triangulation (e.g., via Bluetooth, BLE, WiFi, FemtoCell, other wireless technologies, etc.), and determines the checkout lane or terminal that the user is located at. At block 612, the user purchases goods or services such as pumping gas or scanning items at a grocery store. At block 614, the midrange communication system of the merchant sends the final transaction amount to the transaction application for approval by the user. If the user approves the transaction amount, the consumer may click a 'Pay' button on the transaction application at block 616. At block 618, the transaction application sends the user's account credentials and transaction cryptogram to the midrange communication system. At block 620, the midrange communication system collects the account credentials and transaction cryptogram, and forwards it to an access device associated with the terminal for processing and authorization.

Figure 7:
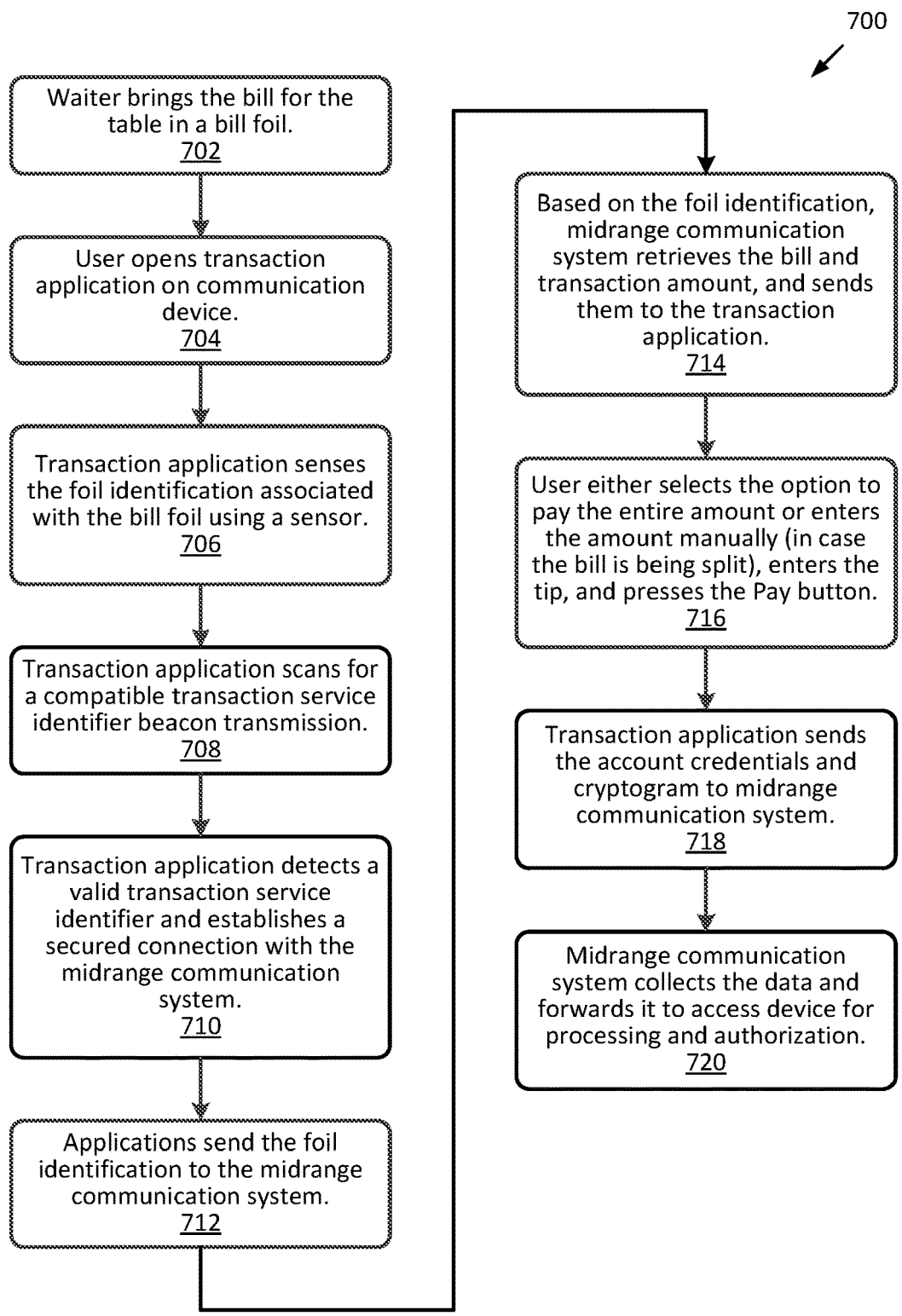
FIG. 7 illustrates another flow diagram of conducting a transaction at a merchant location, according to some embodiments.

FIG. 7 illustrates a flow diagram 700 of conducting a transaction at a merchant location where users are seated at a table or where a merchant staff brings the bill to the user (e.g., a restaurant), according to some embodiments. At block 702, a merchant staff (e.g., a waiter) brings the bill for the table to a user in a bill holder or bill foil. In some embodiments, the bill foil or the table itself may include an identification sensor mechanism (e.g., a RFID sticker, QR-code image, etc.) that can identify the bill foil or table to the user's communication device. At block 704, the user opens the transaction application on the user's communication device. At block 706, the transaction application detects the presence of the bill foil or table using a sensor (e.g., via NFC, Bluetooth, BLE, RFID, camera for QR-code, etc.), and obtain a foil identifier (e.g., a foil or table number) associated with the bill foil or table. At block 708, in response to detecting the presence of the bill foil or table, the transaction application scans for a compatible transaction service identifier beacon transmission. At block 710, the communication device detects a beacon transmission with a transaction service identifier recognized by the transaction application, and sets up a secured connection with the midrange communication system of the merchant.

At block 712, the transaction application sends the foil identification to the midrange communication system. At block 714, based on the foil identification, the midrange communication system retrieves the bill (e.g., an electronic copy of the receipt) and transaction amount, and sends them to the transaction application. At block 716, the user either selects the option to pay the entire amount or enters the amount manually (e.g., when the bill is being split), enters the tip amount (if any), and clicks a 'Pay' button on the transaction application to approve the amount. At block 718, the transaction application then sends the account credentials and transaction cryptogram to the midrange communication system. At block 720, the midrange communication system collects the account credentials and transaction cryptogram, and forwards them to an access device for processing and authorization.

Figure 8:
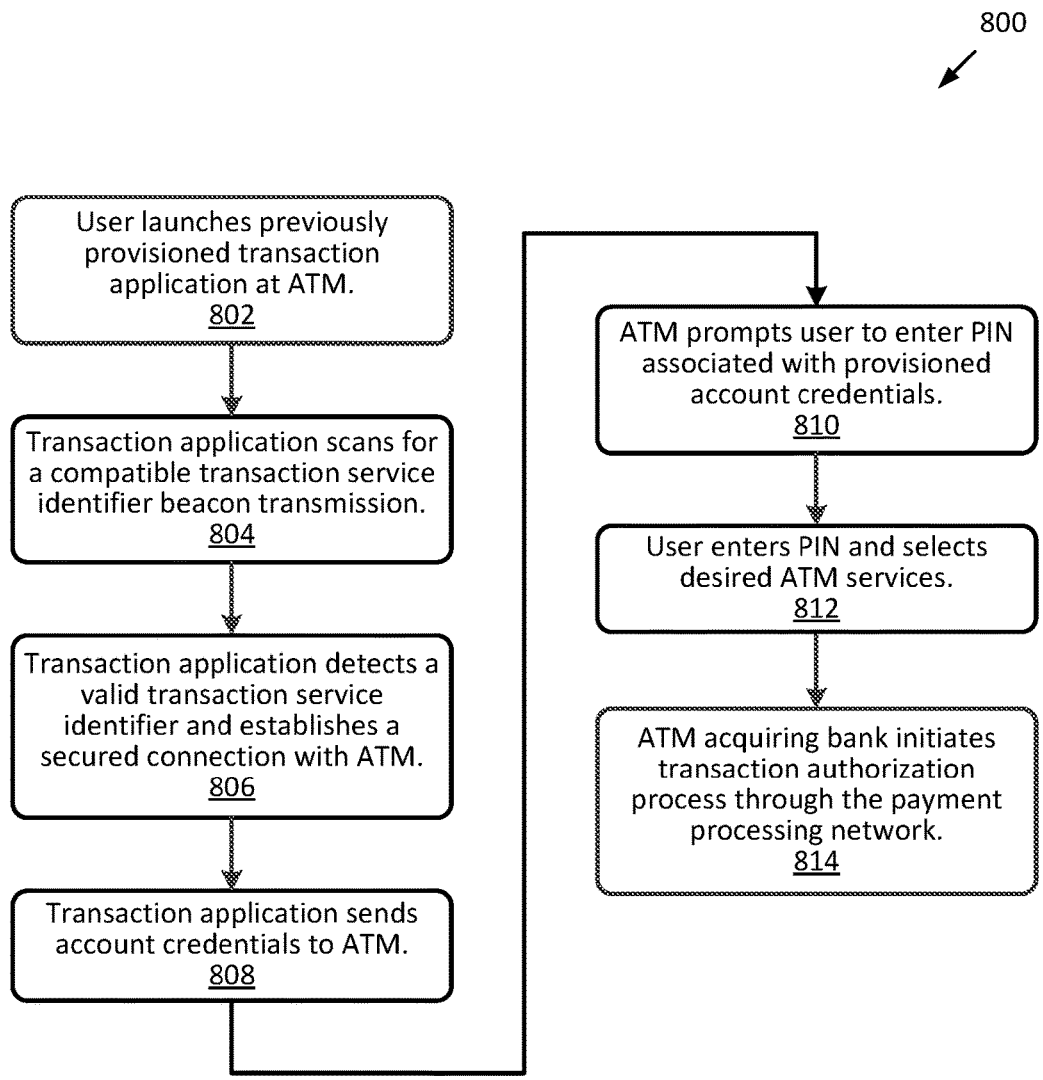
FIG. 8 illustrates a flow diagram of conducting a transaction at an automatic teller machine (ATM), according to some embodiments.

FIG. 8 illustrates a flow diagram 800 of conducting a transaction at an automatic teller machine (ATM), according to some embodiments. At block 802, a user launches a transaction application from a previously provisioned communication device at the ATM location. At block 804, the transaction application scans for a compatible transaction service identifier beacon transmission. At block 806, the communication device detects a beacon transmission with a transaction service identifier recognized by the transaction application, and sets up a secured connection with the midrange communication system of the merchant. At block 808, the communication device sends account credentials to the ATM. At block 810, the ATM prompts the user to enter a PIN associated with the provisioned account credentials. At block 812, the user enters the PIN and selects the desired ATM service (e.g., withdraw, quick cash, deposit, account balance, etc.). At block 814, the acquirer bank associated with the ATM initiates the transaction authorization process though a payment processing network.

Figure 9:
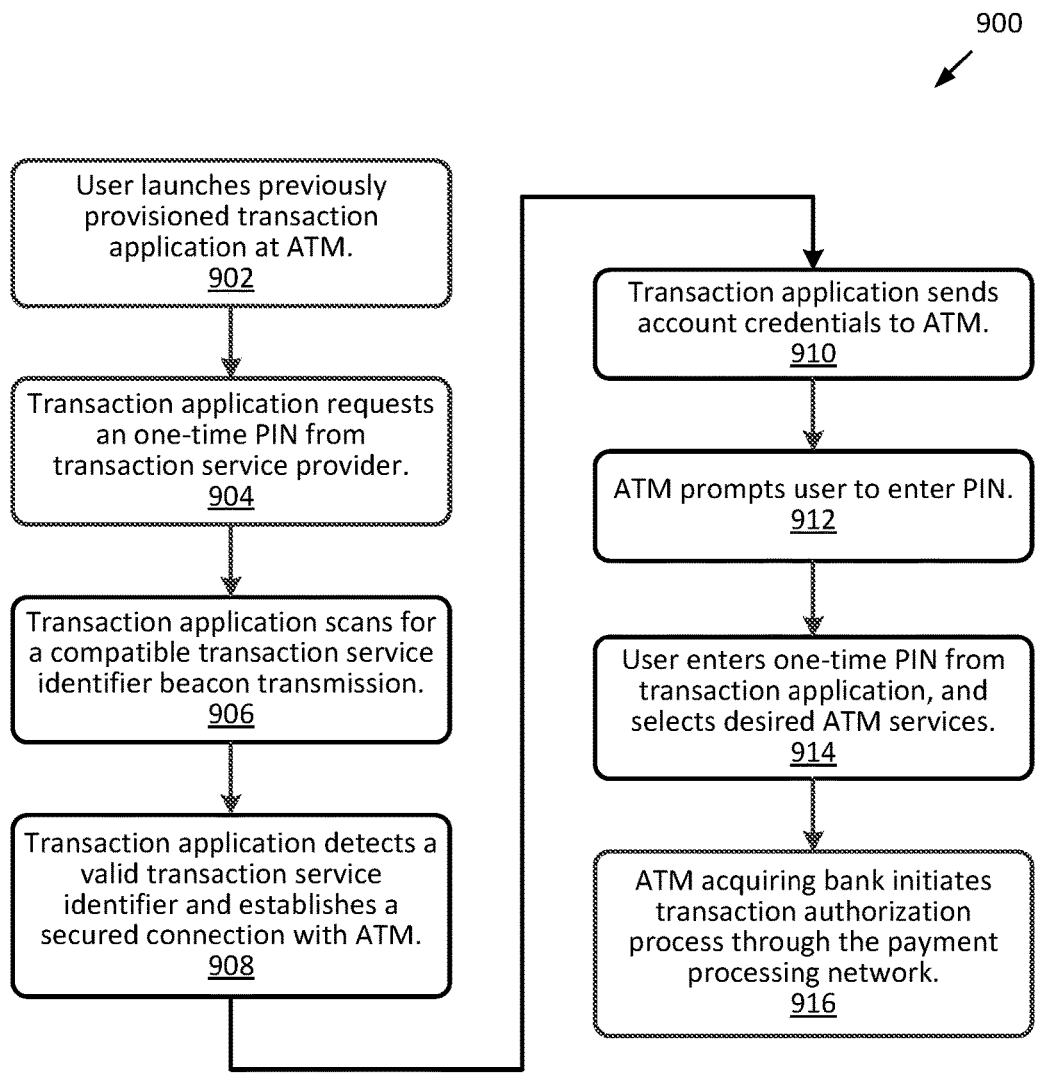
FIG. 9 illustrates another flow diagram of conducting a transaction at an ATM, according to some embodiments.

FIG. 9 illustrates another flow diagram 900 of conducting a transaction at an automatic teller machine (ATM), according to some embodiments. At block 902, a user launches a transaction application from a previously provisioned communication device at the ATM location. At block 904, the transaction application may request a one-time PIN from a transaction service provider (e.g., a bank or issuer, etc.), and the one-time PIN can be sent to the communication device over the air. At block 906, the transaction application scans for a compatible transaction service identifier beacon transmission. At block 908, the communication device detects a beacon transmission with a transaction service identifier recognized by the transaction application, and sets up a secured connection with the midrange communication system of the merchant. At block 910, the communication device sends account credentials to the ATM. At block 912, the ATM prompts the user to enter the one-time PIN. At block 914, the user enters the one-time PIN from the transaction application on the ATM, and selects the desired ATM services. At block 916, the acquirer bank associated with the ATM initiates the transaction authorization process though a payment processing network.

Figure 10:
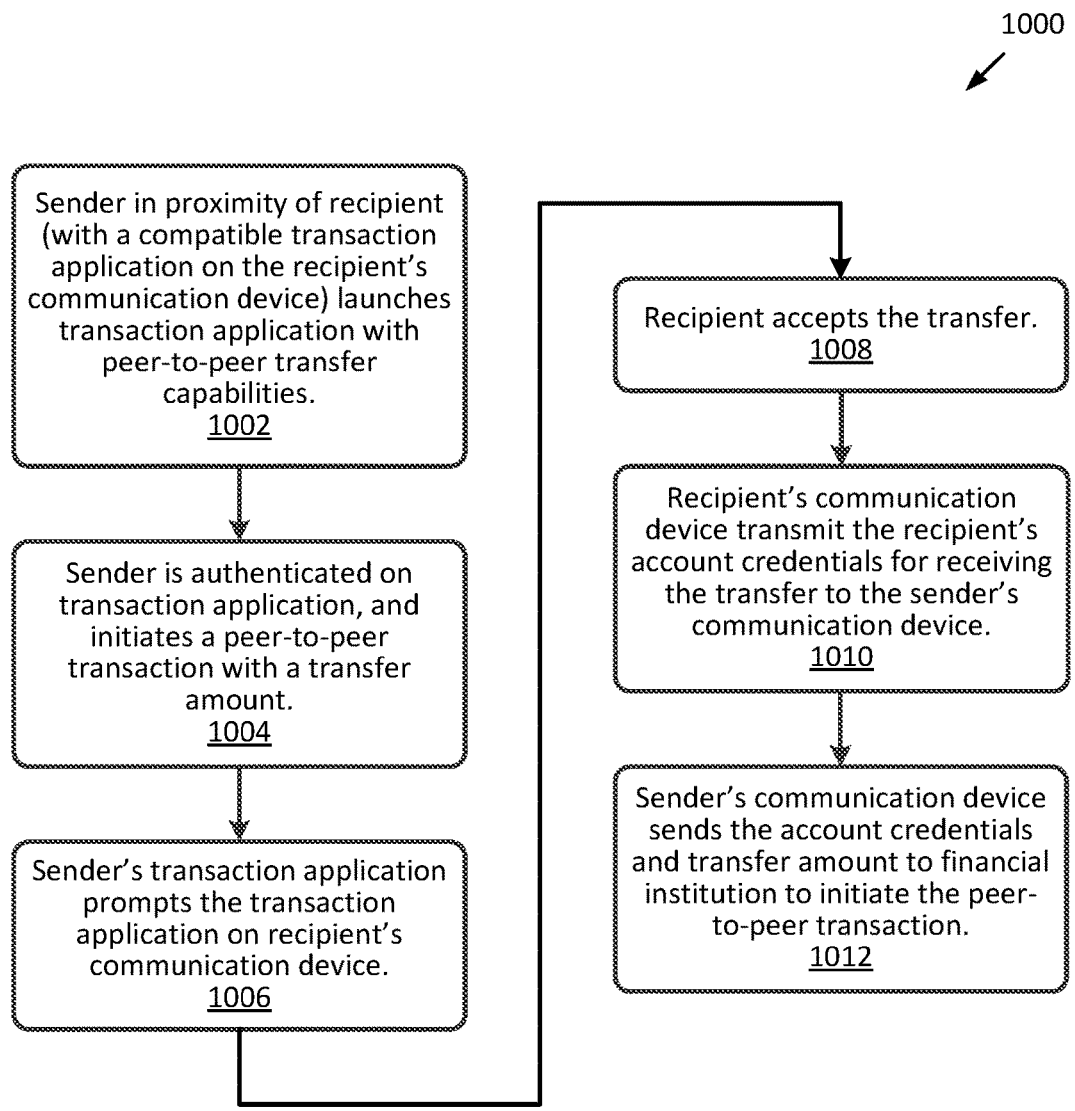
FIG. 10 illustrates a flow diagram of conducting a peer-to-peer transaction, according to some embodiments.

FIG. 10 illustrates a flow diagram 1000 of conducting a peer-to-peer transaction, according to some embodiments. At block 1002, a sender in proximity to a recipient with a compatible transaction application on the recipient's communication device launches the transaction application on the sender's communication device. In some embodiments, the transaction application of the sender's communication device includes peer-to-peer transfer capabilities. At block 1004, the sender is authenticated by the transaction application, and initiates a peer-to-peer transaction with a transfer amount. At block 1006, the sender's transaction application prompts the transaction application on the recipient's communication device. At block 1008, the recipient accepts the transfer using transaction application on the recipient's communication device. At block 1010, the recipient's communication device transmits, to the sender's communication, the account credentials associate with the recipient account for receiving the transfer. At block 1012, the sender's communication device sends the account credentials and the transfer amount to the financial institution to initiate the peer-to-peer transaction.

Figure 11:
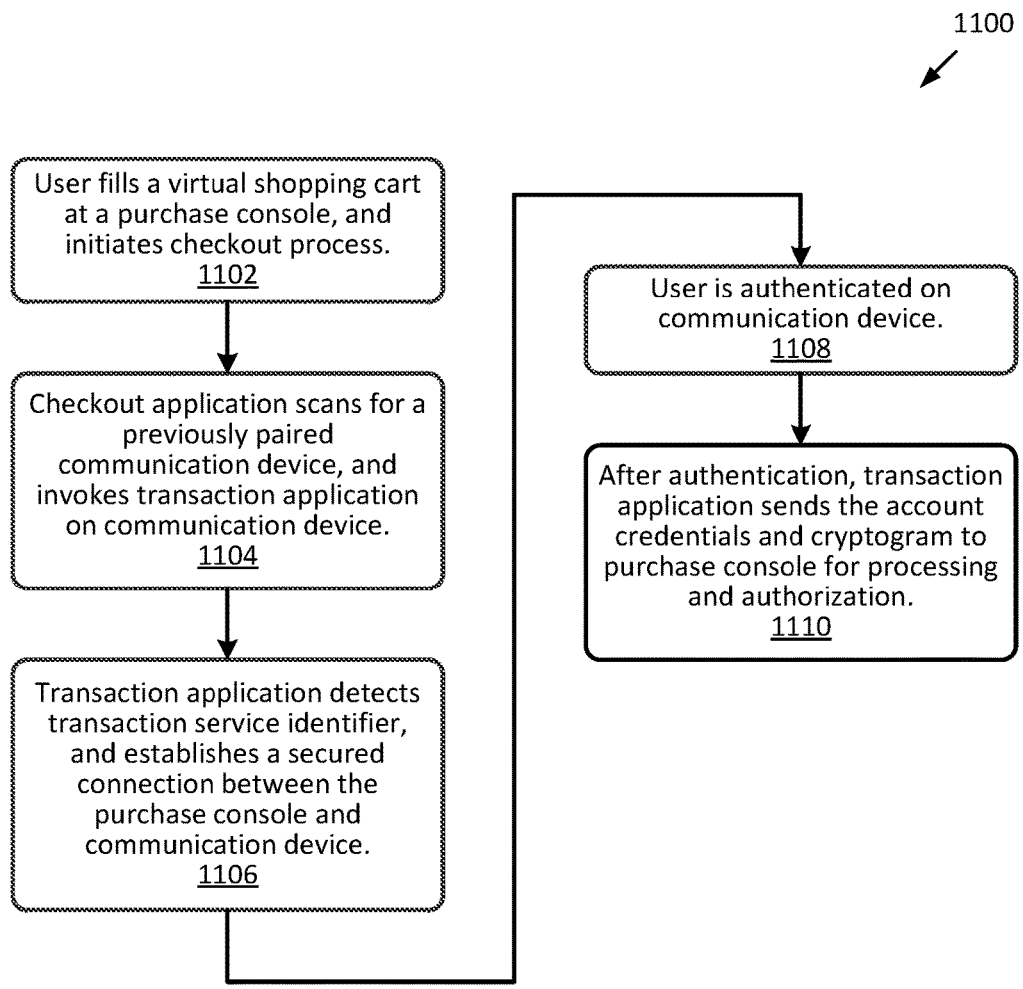
FIG. 11 illustrates a flow diagram of conducting a transaction in a living room environment, according to some embodiments.

FIG. 11 illustrates a flow diagram 1000 of conducting a transaction in a living room environment, according to some embodiments. At block 1102, the user chooses an item to purchase on a midrange wireless connected purchase console (e.g., laptop computer, smart television, set-top box, gaming console, etc.), fills the virtual shopping cart, and initiates a checkout process. At block 1104, the checkout application of the purchase console scans for a previously paired communication device of the user, and invokes the transaction application on the communication device. At block 1106, the transaction application detects a beacon transmission from the purchase console with a transaction service identifier recognized by the transaction application, and sets up a secured connection with the purchase console. At block 1108, the user is authenticated on the communication device. At block 1110, the transaction application sends the account credentials and transaction cryptogram to the purchase console for processing and authorization.

Figure 12:
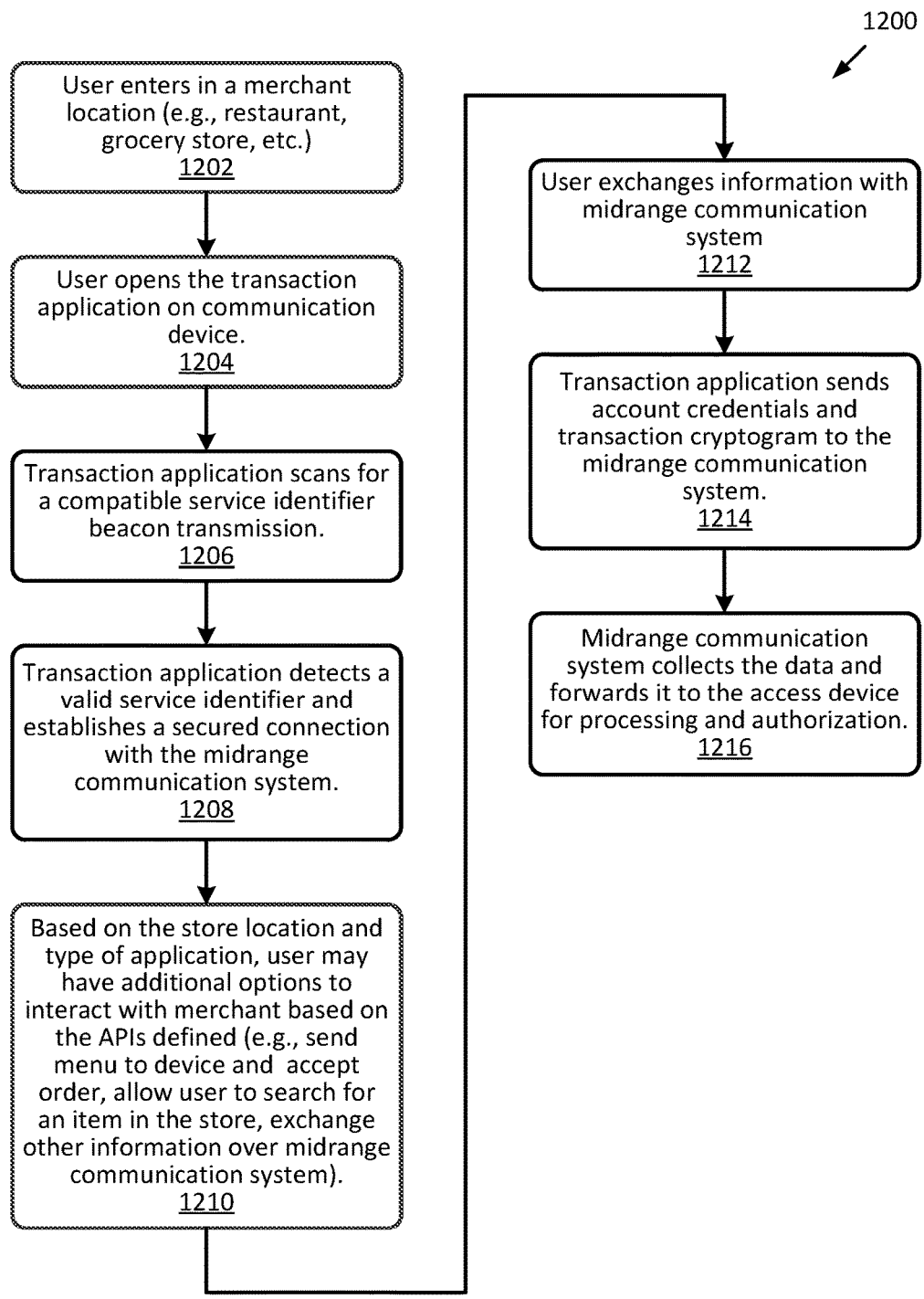
FIG. 12 illustrates a flow diagram of facilitating value-added services, according to some embodiments.

FIG. 12 illustrates a flow diagram 1200 of facilitating value-added services, according to some embodiments. At block 1202, a user enters a merchant location (e.g., a restaurant, grocery store, etc.). At block 1204, the user opens the transaction application on the user's communication device. At block 1206, the transaction application scans for a compatible service identifier beacon transmission. At block 1208, the communication device detects a beacon transmission with a service identifier recognized by the transaction application, and sets up a secured connection with the midrange communication system of the merchant.

At block 1210, based on the store location and type of transaction application and services supported, the user may be provided with additional options to interact with merchant based on a set of application programming interface (API) functions defined for the transaction application. For example, the addition options may include services such as sending a menu to the communication device and accepting an order through the transaction application, allowing user to search for an item in the store, or exchange other information over midrange communication system of the merchant such as loyalty information, etc. At block 1212, the user exchanges information based on the supported service with midrange communication system of the merchant via the transaction application. At block 1214, the transaction application sends the user's account credentials and transaction cryptogram to the midrange communication system. At block 1216, the midrange communication system collects the account credentials and transaction cryptogram, and forwards it to an access device for processing and authorization.

Figure 13:
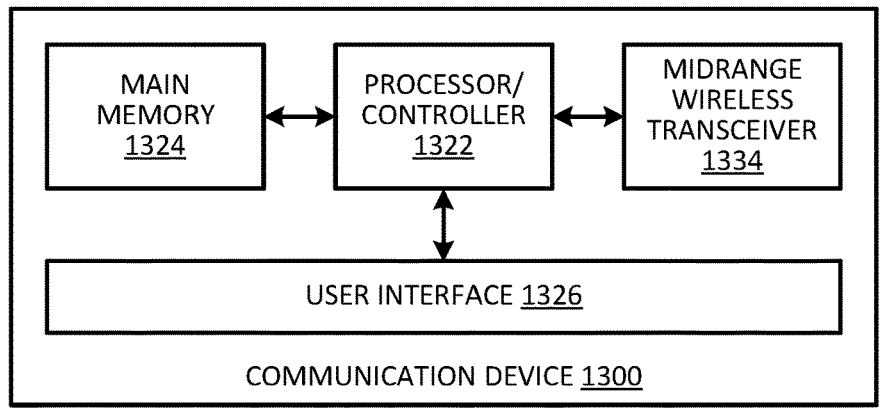
FIG. 13 illustrates a block diagram of a communication device, according to some embodiments.

FIG. 13 illustrates a block diagram of the components of a communication device 1300, according to some embodiments. Communication device 1300 may be a mobile device, or an accessory that can be communicatively coupled to a mobile device. For example, communication device 1300 can be an accessory such as a vehicle (e.g., an automobile), a wearable device (e.g., or a smartwatch, health monitoring device, etc.), or other device that can be used to extend the functionality of a mobile device. Communication device 1300 includes a processor or a controller 1322 coupled to main memory 1324, and user interface 1326. Processor or controller 1322 can be implemented as one or more integrated circuits (e.g., one or more single core or multicore microprocessors and/or microcontrollers), and is used to control the operation of communication device 1300. Processor or controller 1322 can execute a variety of programs in response to program code or computer-readable code stored in memory 1324, and can maintain multiple concurrently executing programs or processes. User interface 1326 may include an input interface such as any number of buttons, knobs, microphone and/or a touchscreen that can receive user input, and an output interface such as a display (may be part of a touchscreen) and/or speakers.

In some embodiments, for example, if communication device 1300 is a vehicle, the display of user interface 1326 can be mounted at the center console of the interior of the vehicle, and may display any types of information including information such as mapping and navigation information, as well as merchant and transaction information. Communication device 1300 may also include other subsystems not specifically shown. For example, communication device 1300 may include a navigation subsystem (not shown) to perform mapping and navigation functions. In some embodiments, the navigation subsystem may be integrated as part of communication device 1300 or be a separate component coupled to communication device 1300.

In some embodiments, communication device 1300 may include a wireless communication subsystem that can be used to provide network connectivity communication device 1300 and/or to communicate wirelessly with a wireless base station. Wireless communication subsystem may use WiFi, WiMax, or other types of wireless network communication protocols to connect communication device 1300 to a network such as the internet such that communication device 1300 can communicate with a remote server, for example, to retrieve merchant information or request account credentials. The wireless communication subsystem may also include one or more midrange wireless transceiver 1334 such as Bluetooth, BLE, ZigBee, etc. transmitters and/or receivers that can be used to communicate with a midrange wireless communication system in the vicinity of communication device 1300. For example, in embodiments in which communication device 1300 is a vehicle, one or more of such midrange wireless transceivers can be mounted at one or more locations on the vehicle (e.g., driver side, passenger side, in dashboard, front bumper, etc.) to communicate with nearby access devices.

Figure 14:
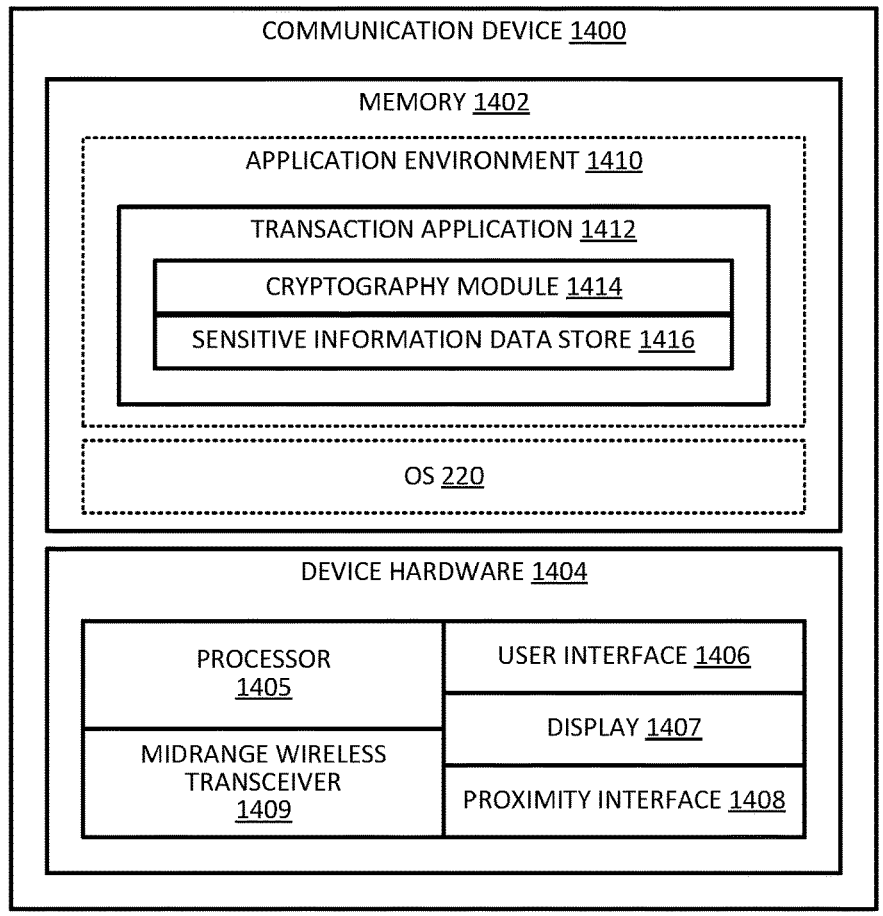
FIG. 14 illustrates another block diagram of a communication device, according to some embodiments.

FIG. 14 illustrates a block diagram of a communication device 1400, according to some embodiments. In some embodiments, communication device 1400 can be a mobile device. Communication device 1400 may include device hardware 1404 coupled to a memory 1402. Device hardware 1404 may include a processor 1405, a midrange wireless transceiver 1409, and a user interface 206. In some embodiments, device hardware 1404 may include a display 1407 (which can be part of user interface 1406). Device hardware 1404 may also include a proximity interface 1408 that may include, for example, a NFC transceiver. Processor 1405 can be implemented as one or more integrated circuits (e.g., one or more single core or multicore microprocessors and/or microcontrollers), and is used to control the operation of communication device 200. Processor 1405 can execute a variety of programs in response to program code or computer-readable code stored in memory 1402, and can maintain multiple concurrently executing programs or processes. Midrange wireless transceiver 1409 may include one or more specialized RF transceivers that can be used by portable communication device 1400 to communicate with other devices over midrange distance using Bluetooth, BLE, ZigBee, etc. User interface 1406 can include any combination of input and output elements to allow a user to interact with and invoke the functionalities of communication device 1400. In some embodiments, user interface 1406 may include a component such as display 1407 that can be used for both input and output functions. Proximity interface 1408 may include one or more specialized RF transceivers (e.g., near field communication (NFC) transceivers) to interact with other devices in close proximity.

Memory 1402 can be implemented using any combination of any number of non-volatile memories (e.g., flash memory) and volatile memories (e.g., DRAM, SRAM), or any other non-transitory storage medium, or a combination thereof media. Memory 1402 may store an operating system (OS) 1414 and an application environment 1410 where one or more applications reside including transaction application 1412 to be executed by processor 1405. Transaction application 1412 can be an application that uses, accesses, and/or stores sensitive information or tokens. For example, transaction application 1412 can be a wallet or payment application that uses a token to conduct transactions via communication device 1400. In some embodiments, access to transaction application 1412 by a user can be protected by user authentication data such as a password, passcode, PIN, etc. For example, when a user attempts to launch or execute transaction application 1412, the user may be requested to enter valid user authentication data before the user can access transaction application 1412. Transaction application 1412 may include a cryptography module 1414 and a sensitive information data store 1416. In some embodiments, one or more of these components can be provided by another application or component that is not part of application 1412. Sensitive information data store 1416 may store sensitive information such as account credentials (e.g., PAN, token) and other account parameters such as a limited-use key that are used to conduct a transaction. Cryptography module 1414 may provide cryptographic functionalities for transaction application 1412. For example, cryptography module 1414 may implement and perform encryption/decryption operations for transaction application 1412 using encryption algorithms such as DES, AES, TDES/TDEA, or the like, and/or hash functions such as SHA, or the like. For example, when transaction application 1412 accesses sensitive information data store 1416 to retrieve and use the sensitive information such as a token or limited-use key stored therein to conduct a transaction, transaction application 1416 may invoke cryptography module 1414 to generate a transaction cryptogram based on the limited-use key and/or token.

As described, the inventive techniques may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A communication device comprising:
a wireless transceiver;
a controller; and
a memory storing a set of instructions, which when executed by the controller, causes the communication device to:
detect, using the wireless transceiver, a transmission from a wireless base station;
determine that the transmission includes a transaction service identifier recognized by a transaction application accessible to the communication device;

in response to determining that the transmission includes the transaction service identifier recognized by the transaction application:
  invoke the transaction application associated with the transaction service identifier; and
  establish a secured communication channel with the wireless base station;
receive, on the secured communication channel, transaction information for a transaction associated with a transaction identifier mapped to a device identifier associated with the communication device; and
transmit, on the secured communication channel, a transaction cryptogram from the transaction application to the wireless base station to conduct the transaction.

2. The communication device of claim 1, wherein the communication device is a first communication device communicatively coupled to a second communication device, and the transaction application is executed on the second communication device.

3. The communication device of claim 2, wherein the first communication device is a vehicle.

4. The communication device of claim 2, wherein the set of instructions further causes the first communication device to forward the transaction information to the second communication device.

5. The communication device of claim 1, wherein the set of instructions further causes the communication device to receive the transaction identifier mapped to the device identifier from the wireless base station.

6. The communication device of claim 1, wherein the transaction information is received in response to the transaction identifier being provided to an access device communicatively coupled to the wireless base station.

7. The communication device of claim 2, wherein the device identifier identifies one of the first communication device or the second communication device.

8. A method comprising:
  detecting, by a wireless transceiver of a communication device, a transmission from a wireless base station;
  determining that the transmission includes a transaction service identifier;
  in response to determining that the transmission includes the transaction service identifier:
    invoking a transaction application associated with the transaction service identifier; and
    establishing a secured communication channel with the wireless base station;
  receiving, from the wireless base station on the secured communication channel, transaction information for a transaction associated with a transaction identifier mapped to a device identifier associated with the communication device; and
  sending a transaction cryptogram from the transaction application to the wireless base station to conduct the transaction.

9. The method of claim 8, wherein the communication device is a first communication device communicatively coupled to a second communication device, and the transaction application is executed on the second communication device.

10. The method of claim 9, wherein the first communication device is a vehicle.

11. The method of claim 9, further comprising:
  forwarding the transaction information to the second communication device.

12. The method of claim 8, further comprising:
  receiving the transaction identifier mapped to the device identifier from the wireless base station.

13. The method of claim 8, wherein the transaction information is received in response to the transaction identifier being provided to an access device communicatively coupled to the wireless base station.

14. The method of claim 9, wherein the device identifier identifies one of the first communication device or the second communication device.

15. A device comprising:
  a wireless transceiver;
  a controller; and
  a memory storing a set of instructions, which when executed by the controller, causes the device to:
    transmit, using the wireless transceiver, a transmission that includes a transaction service identifier;
    in response to a transaction application installed on a communication device recognizing the transaction service identifier, establish a secured communication channel with the communication device;
    transmit, on the secured communication channel, transaction information for a transaction associated with a transaction identifier mapped to a device identifier associated with the communication device; and
    receive, on the secured communication channel, a transaction cryptogram from the transaction application to conduct the transaction.

16. The device of claim 15, wherein the communication device is a mobile device, or an accessory communicatively coupled to the mobile device.

17. The device of claim 15, wherein the communication device is a vehicle.

18. The device of claim 15, wherein the set of instructions further causes the device to transmit the transaction identifier to the communication device.

19. The device of claim 15, wherein the set of instructions further causes the device to forward the transaction cryptogram to an access device.

20. The device of claim 15, wherein the transaction cryptogram is generated based on a token.

* * * * *